UNITED STATES PATENT OFFICE.

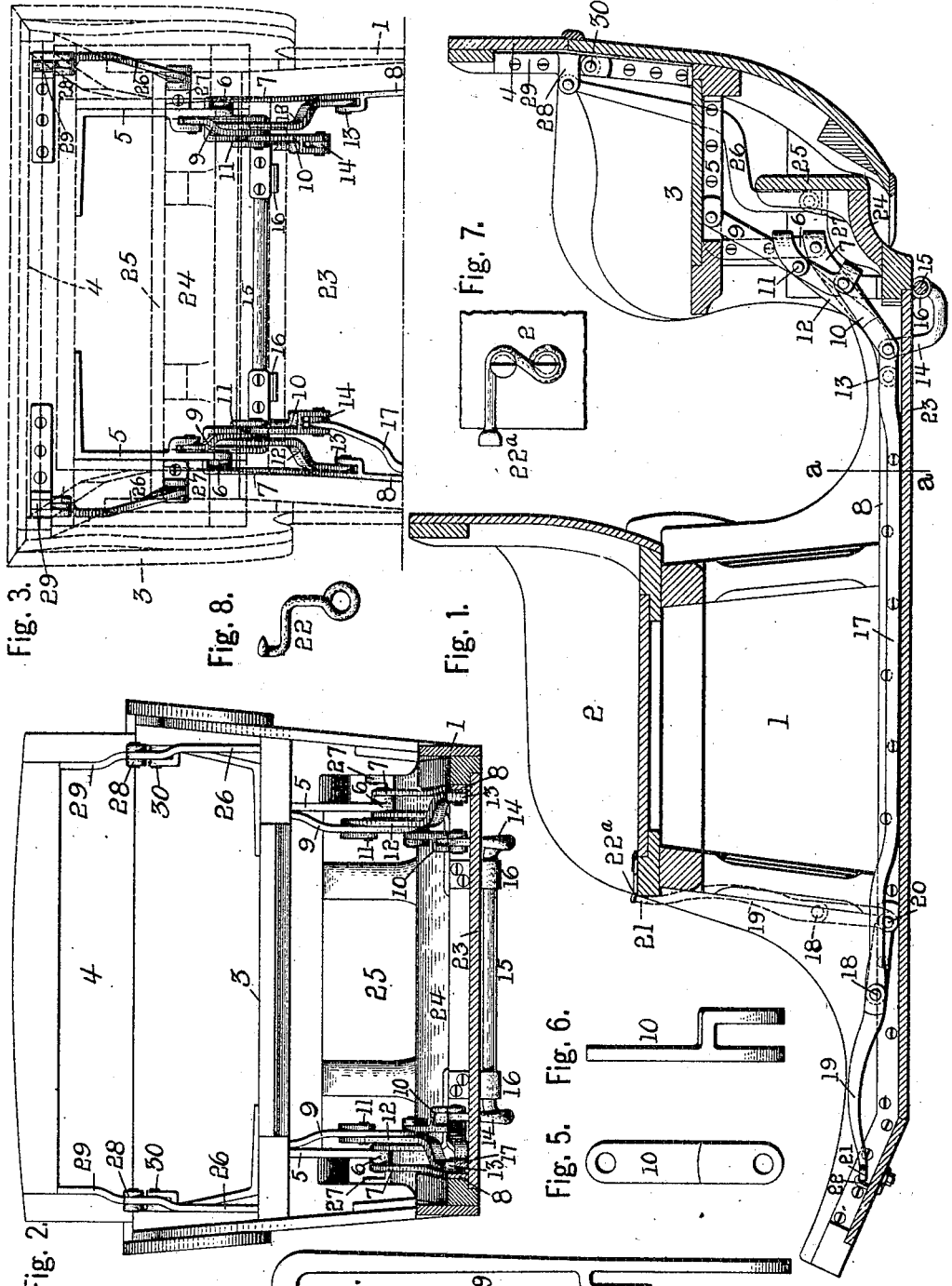

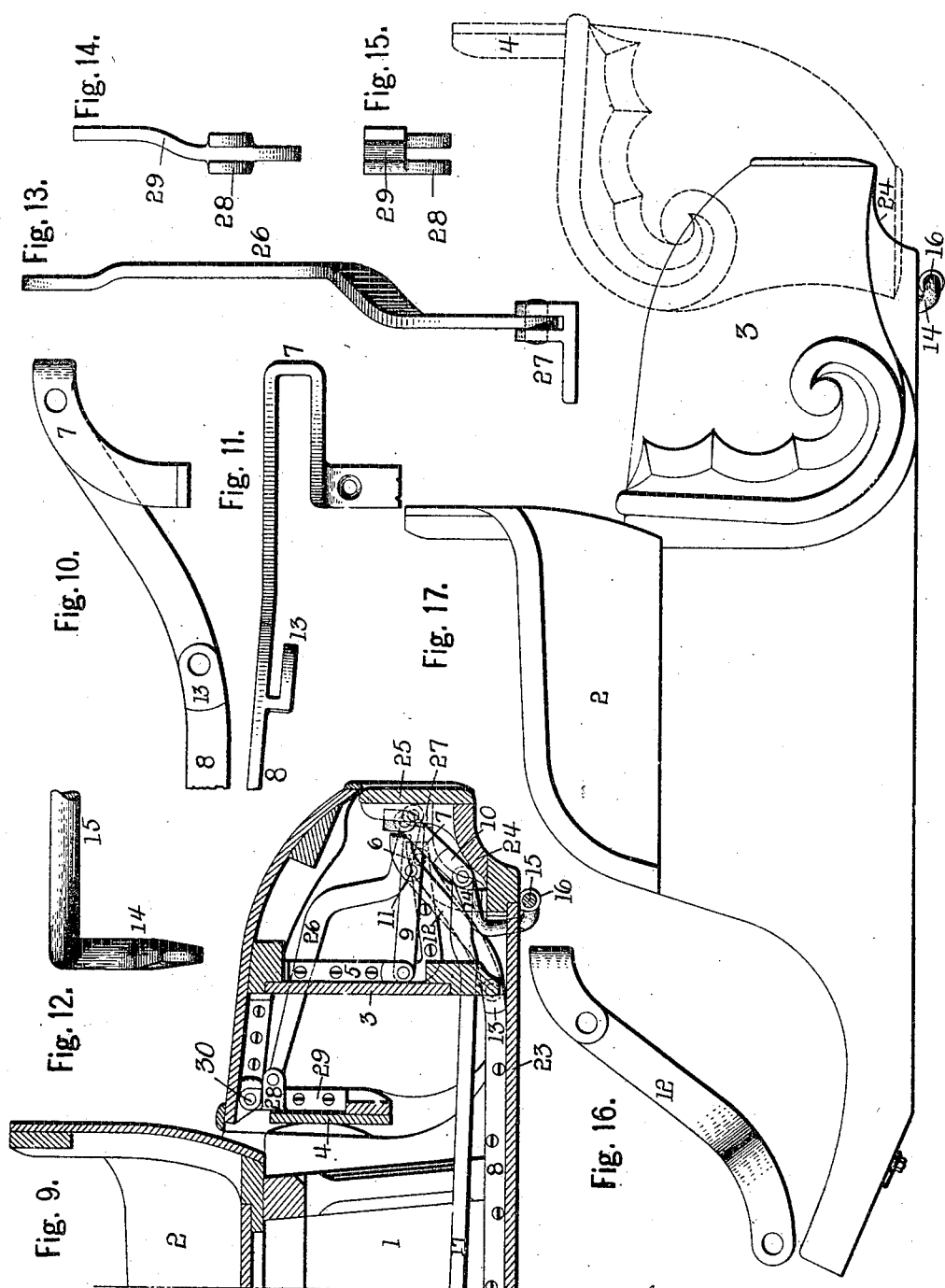

FRANKLIN STRATTON, OF BUFFALO, NEW YORK, ASSIGNOR TO THE STRATTON ROTATING ENGINE CO., OF BUFFALO, NEW YORK, A CORPORATION.

VEHICLE-BODY.

No. 837,355.  Specification of Letters Patent.  Patented Dec. 4, 1906.

Application filed September 5, 1905. Serial No. 276,954.

*To all whom it may concern:*

Be it known that I, FRANKLIN STRATTON, a citizen of the United States, residing at Buffalo, in the county of Erie and State of New York, have invented a certain new and useful Improvement in Vehicle-Bodies, of which the following is a specification.

This invention relates to an improved body for vehicles, automobiles, and the like; and it consists of a body having a folding seat, a fixed seat, and means arranged to be conveniently manipulated by an occupant of the fixed seat for closing or opening said folding seat.

The object of the invention is to arrange means for opening or closing a folding seat without subjecting an occupant or operator to the inconvenience of stepping from his seat.

In the preferred adaptation shown in the drawings the body has a fixed front seat and a folding rear seat and means for opening and closing said folding seat, including an operating-lever extending within convenient reach of an occupant of the front seat.

The invention also relates to certain details of construction, all of which will be fully and clearly hereinafter described and claimed, reference being had to the accompanying drawings, in which—

Figure 1 represents a central longitudinal section through the improved vehicle-body, showing the folding seat in open position, the operating-lever being also shown in the position it assumes when the folding seat is closed in dotted lines. Fig. 2 is a front elevation of the rear folding seat, a section being taken through the vehicle-body on line *a a*, Fig. 1. Fig. 3 is a plan view of the mechanism for operating the folding seat, the frame of the seat and a portion of the vehicle-body being shown in dotted lines. Fig. 4 is an enlarged detached view of the operating-lever. Figs. 5 and 6 are enlarged detached side and front views of one of the short forked connecting-links. Fig. 7 is an enlarged detached plan view of the spring-catch on the front seat for retaining the operating-lever in its substantially vertical position. Fig. 8 is an enlarged plan view of the spring-catch on the vehicle-dash for retaining the operating-lever in its lower position. Fig. 9 is a central longitudinal section through the rear portion of the vehicle-body, showing the rear seat in its folded or closed position. Figs. 10 and 11 are enlarged fragmentary side and plan views of the rear end of one of the sill-irons. Fig. 12 is an enlarged fragmentary plan view of the rock-shaft. Fig. 13 is an enlarged detached front view of the lever for operating the lazy-back and its pivoting-block. Figs. 14 and 15 are enlarged detached front and plan views of one of the hinge members which connect the lazy-back to the main portion of the seat. Fig. 16 is an enlarged detached side view of one of the lower members of the hinge connection. Fig. 17 is a side view of the improved vehicle-body, showing the folding seat in closed or folded position in full lines and in its open position in dotted lines.

In referring to the drawings for the details of construction, like numerals designate like parts.

The body consists of the body proper, 1, a fixed front seat 2, a folding rear seat, and mechanism for opening and closing said rear seat. The rear seat is composed of the seat 3 itself, which is pivoted or hinged at its lower extremity to the rear of the body 1, and a lazy-back 4, pivoted or hinged to the upper portion of the back of the seat 3.

The mechanism for opening and closing the rear seat comprises a series of pivotal connections which are controlled by an operating-lever located in the front portion of the body proper within convenient reach of an occupant of the front seat. The pivotal connections consist of angular rods or levers arranged in two series, one series on each side of the seat, and as both are of precisely the same construction but one series will be described, the reference-numerals, however, being applied to like members on both sides.

The rear seat 3 has an angular bar 5 secured thereto by screws, the lower end 6 of which is pivoted to the rear end 7 of the sill-iron 8. The rear end of the sill-iron curves upward and is then bent upon itself to form a fork between which the angular bar 5 is pivoted. A diagonally-extending lever 9 is pivoted at its upper end to the horizontal portion of the angular bar 5, and the lower end of the lever is bent upon itself to form a fork, between which the rear end of a short forked connecting-link 10 is pivoted. The lever 9 is pivoted at an intermediate point 11 to the upper rear end of a curved bar 12, the front end of which is pivoted in a forked portion 13 in the sill-iron. (See Figs. 2 and 3.) The pivot 11 forms a movable fulcrum upon which the lever 9 turns, the fulcrum having a slight swinging movement from the sill-iron. The front end of the short forked connecting-link 10 is pivoted to an angular crank 14, formed integral with a rock-shaft 15. This rock-shaft is supported beneath the vehicle-body in bearings 16. (See Fig. 2.) The angular cranks 14 pass through and operate in openings in the floor of the vehicle.

A connecting-rod 17 is pivoted at its rear end to the front end of one of the short forked connecting-links 10 at the pivoting-point of said link and the angular crank 14. The connecting-rod 17 extends forward and is pivoted at its front end to an intermediate point 18 on an operating-lever 19. The lower end of this operating-lever is pivoted at 20 to a forked portion of the sill-iron. (See Fig. 1.) The upper end of the lever is bent at right angles to form a handle 21, which is grasped by the operator when it is desired to open or close the folding seat. The lever 19 is retained in its lower position, as shown in Fig. 1, by a spring hook or catch 22, formed as shown in Fig. 8. This catch is secured to the under side of the dash and projects through an opening therein. A spring-catch 22$^a$, formed as shown in Fig. 7, is secured to the front seat 2 and retains the operating-lever when in its vertical position, substantially as shown in dotted lines in Fig. 1.

The rear portion of the body of the vehicle is formed as shown in Figs. 1 and 9, the floor 23 terminating in a curved portion 24, which in turn terminates in a vertical portion 25. This not only gives a pleasing finish to the vehicle, but also serves to close the opening, which would otherwise prove unsightly when the rear seat is closed, and to conceal and protect the operating mechanism of the seat. The lazy-back 4 is automatically folded into the position shown in Fig. 9 by an angular lever 26, the lower end of which is pivoted to a block 27, fastened to the curved portion 24 of the vehicle-body. The upper end of the lever 26 is pivoted to a forked portion 28 on the upper member 29 of the hinge which joins the lazy-back to the permanent back of the seat 3. When the seat is folded, the lever 26 turns the lazy-back on the hinge 30 and it assumes the position shown in Fig. 9.

The operation of the folding seat is as follows: The mechanism being in the position shown in Fig. 1, the operating-lever 19 is released from the catch 22, attached to the dash, by simply pressing thereon and is moved rearward on its pivot from a substantially horizontal position into the substantially vertical position shown in dotted lines on Fig. 1 by an occupant of the fixed forward seat. This moves the connecting-rod 17 backward and rocks the shaft, at the same time operating all the pivoted links and levers and bringing them into position shown in Fig. 9, and thereby closing the rear folding seat. The operating-lever 19 is locked in its substantially vertical position by forcing its forward end under the spring 22$^a$, attached to the front seat. The folding seat is opened by a reverse movement of the operating-lever.

The great advantage of this construction is that the folding seat can be opened or closed very quickly and conveniently by an occupant of another seat without said occupant leaving the seat, stepping from the body, or inconveniently turning or changing his position on said seat. Other advantages reside in the simplicity, comparative cheapness, and great strength of the various parts.

I claim as my invention—

1. In a device of the class described, a body having a plurality of seats one of which is movable to open or close and another of which is fixed in position on the body, and means for opening and closing said movable seat adapted to be conveniently manipulated from the fixed seat.

2. In a device of the class described, a body having a plurality of seats one of which is movable to open or close and another of which is fixed in position on the body, and means for opening or closing said movable seat adapted to be conveniently manipulated from the fixed seat, including an operating-lever extending within convenient reach of an occupant of said fixed seat.

3. In a device of the class described, a body having a plurality of seats one of which is movable to open or close and another of which is fixed in position on the body, means for opening and closing said movable seat adapted to be conveniently manipulated from the fixed seat including an operating-lever extending within convenient reach of an occupant of the fixed seat, and devices for locking said lever in either of its positions, whereby the movable seat is locked in place when either open or closed.

4. In a device of the class described, a body having a plurality of seats one of which is movable to open or close and another of which is fixed in position on the body, means for opening and closing said movable seat adapted to be conveniently manipulated from the fixed seat including an operating-lever extending within convenient reach of an occupant of the fixed seat, a catch attached to the body for locking the lever in one of its positions and a catch attached to one of the seats for locking the lever in another of its positions.

5. In a device of the class described, a body, a seat fixed to said body, a seat hinged to said body, mechanism for opening and closing said hinged seat including an operating-lever located in front of the fixed seat and within convenient reach of an occupant of said fixed seat, a lazy-back hinged to said hinged seat and means whereby the lazy-back will automatically open or close as the hinged seat opens or closes.

6. In a device of the class described, a body, a front seat fixed to said body, a rear seat hinged to said body, an operating-lever located in front of the front seat and within convenient reach of an occupant of said front seat and connecting means between the hinged seat and operating-lever, whereby the hinged seat is opened and closed by movement of the operating-lever.

7. In a device of the class described, a body, a seat hinged to said body, a rock-shaft having support from the body and having a crank, a series of connections between the hinged seat and the crank, an operating-lever and a rod connecting the operating-lever to the series of connections whereby the hinged seat is opened and closed by the operating-lever.

8. In a device of the class described, a body, a seat hinged to said body, a rock-shaft having support from the body and having a crank at each end, a series of connections between the hinged seat and each of the cranks, an operating-lever and a rod connecting the operating-lever to at least one of the series of connections, whereby the hinged seat is opened and closed by the operating-lever.

9. In a device of the class described, a body, a front seat fixed rigidly to said body, a rear seat hinged to said body, and mechanism for opening or closing said rear seat including an operating-lever located in front of and within convenient reach of an occupant of the front seat.

10. In a device of the class described, a body, a seat fixed rigidly to said body, a seat hinged to said body and mechanism for opening and closing said hinged seat including an operating-lever in front of and adapted to be conveniently manipulated from the fixed seat.

11. A body having a movable rear portion adapted to be opened to constitute a seat and to be closed upon said body, and mechanism for opening and closing said body including an operating-lever located in the front portion of said body.

12. A body having a movable rear portion adapted to be opened to constitute a seat and to be closed upon said body, and a lazy-back for said movable portion arranged to open or close in unison with the movable portion, a fixed front seat and means for moving said movable rear portion including an operating-lever located within convenient reach of an occupant of the fixed front seat.

FRANKLIN STRATTON.

Witnesses:
R. E. ERDMAN,
A. J. SANGSTER.